United States Patent
Shapiro et al.

(10) Patent No.: US 9,575,998 B2
(45) Date of Patent: *Feb. 21, 2017

(54) ADAPTIVE PRESENTATION OF CONTENT BASED ON USER ACTION

(71) Applicant: Adobe Systems Incorporated, San Jose, CA (US)

(72) Inventors: John R. Shapiro, San Francisco, CA (US); Robert Tyler Voliter, Brisbane, CA (US); Evtim Ivanov Georgiev, San Francisco, CA (US); Joseph Michael Andolina, San Francisco, CA (US); Kim P. Pimmel, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 286 days.

This patent is subject to a terminal disclaimer.

(21) Appl. No.: 13/712,008

(22) Filed: Dec. 12, 2012

(65) Prior Publication Data

US 2014/0165001 A1    Jun. 12, 2014

(51) Int. Cl.
  *G06F 3/0482*  (2013.01)
  *G06F 17/30*  (2006.01)
  *G06F 3/0485*  (2013.01)

(52) U.S. Cl.
  CPC ....... *G06F 17/30274* (2013.01); *G06F 3/0485* (2013.01)

(58) Field of Classification Search
  CPC . G06F 3/0482; G06F 3/0485; G06F 17/30274
  USPC .................................................. 715/784, 792
  See application file for complete search history.

(56) References Cited

U.S. PATENT DOCUMENTS

| | | | |
|---|---|---|---|
| 2007/0143714 A1 | 6/2007 | Barbieri | |
| 2008/0195970 A1* | 8/2008 | Rechsteiner et al. | 715/810 |
| 2008/0205789 A1* | 8/2008 | Ten Kate et al. | 382/284 |
| 2008/0209351 A1* | 8/2008 | Macadaan | G06F 3/0482 715/762 |
| 2009/0113307 A1* | 4/2009 | MacKenzie | 715/732 |
| 2009/0317019 A1 | 12/2009 | Puliur | |
| 2009/0327965 A1* | 12/2009 | Averett et al. | 715/835 |
| 2010/0057696 A1 | 3/2010 | Miyazawa et al. | |
| 2010/0153999 A1* | 6/2010 | Yates | 725/39 |
| 2010/0162126 A1 | 6/2010 | Donaldson et al. | |
| 2010/0223580 A1 | 9/2010 | Fujiwara | |

(Continued)

FOREIGN PATENT DOCUMENTS

WO    WO 2011056105 A1 *  5/2011

OTHER PUBLICATIONS

"Non-Final Office Action", U.S. Appl. No. 13/711,969, filed Aug. 1, 2014, 30 pages.

(Continued)

*Primary Examiner* — Jennifer To
*Assistant Examiner* — John Repsher, III
(74) *Attorney, Agent, or Firm* — Wolfe-SBMC

(57) ABSTRACT

Various embodiments provide an intelligent adaptive content canvas that can enable users to access content, such as photos and videos, and consume the content in an adaptive environment that tailors the user experience in accordance with various parameters. The user experience is personalized to the user and is adaptively predictive in a manner that attempts to surface content that the user would likely wish to consume.

31 Claims, 14 Drawing Sheets

(56) References Cited

U.S. PATENT DOCUMENTS

| | | |
|---|---|---|
| 2010/0281425 A1 | 11/2010 | Vartiainen et al. |
| 2010/0318554 A1 | 12/2010 | Walker et al. |
| 2011/0066627 A1 | 3/2011 | Seung et al. |
| 2011/0090347 A1 | 4/2011 | Buckner et al. |
| 2011/0225496 A1* | 9/2011 | Jeffe et al. ............... 715/716 |
| 2011/0234504 A1 | 9/2011 | Barnett et al. |
| 2012/0036482 A1* | 2/2012 | Haynes et al. ............. 715/838 |
| 2012/0060094 A1* | 3/2012 | Irwin et al. ............... 715/719 |
| 2012/0102410 A1 | 4/2012 | Gewecke et al. |
| 2012/0162266 A1 | 6/2012 | Douglas et al. |
| 2012/0173977 A1* | 7/2012 | Walker et al. ............. 715/716 |
| 2012/0254780 A1 | 10/2012 | Mouton et al. |
| 2013/0050249 A1 | 2/2013 | Grabowski et al. |
| 2013/0063442 A1 | 3/2013 | Zaman et al. |
| 2013/0063443 A1 | 3/2013 | Garside et al. |
| 2013/0080968 A1* | 3/2013 | Hanson ............ G06F 9/4443 715/783 |
| 2013/0083051 A1 | 4/2013 | Sigal |
| 2013/0152129 A1* | 6/2013 | Alberth et al. ............. 725/41 |
| 2013/0283318 A1* | 10/2013 | Wannamaker ............. 725/56 |
| 2013/0332831 A1* | 12/2013 | Birnkrant et al. .......... 715/719 |
| 2014/0059479 A1 | 2/2014 | Hamburg et al. |
| 2014/0149936 A1 | 5/2014 | Wilder et al. |
| 2014/0164923 A1 | 6/2014 | Georgiev et al. |
| 2014/0164985 A1 | 6/2014 | Pimmel et al. |

OTHER PUBLICATIONS

"Non-Final Office Action", U.S. Appl. No. 13/711,913, filed Aug. 13, 2014, 35 pages.

"Final Office Action", U.S. Appl. No. 13/711,969, filed Feb. 12, 2015, 36 pages.

"Final Office Action", U.S. Appl. No. 13/711,913, filed Feb. 13, 2015, 43 pages.

"Non-Final Office Action", U.S. Appl. No. 13/711,969, filed May 19, 2016, 68 pages.

"Notice of Allowance", U.S. Appl. No. 13/711,969, Nov. 3, 2016, 17 pages.

* cited by examiner

ADAPTIVE PRESENTATION OF CONTENT BASED ON USER ACTION

BACKGROUND

Users typically create content, such as videos and photos, with the expectation that they will derive value or enjoyment from them at some point in the future. Often times a user's content can be distributed across a variety of sources and devices. For example, users may have a portion of their content stored on one or more local devices, as well as at other remote sources such as social networking sites, online services, content aggregation sites, and the like.

In order to consume their content, users typically are forced to manually pull the content from these different associated sources. For example, if a user wishes to browse their locally-stored content, they must access their content locally. Likewise, if the user wishes to browse their remotely-stored content, they must access their content individually, at each remote source.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Various embodiments provide an intelligent adaptive content canvas that can enable users to access content, such as photos and videos, and consume the content in an adaptive environment that tailors the user experience in accordance with various parameters. The user experience is personalized to the user and is adaptively predictive in a manner that attempts to surface content that the user would likely wish to consume.

In at least some embodiments, the intelligent adaptive content canvas is navigable in various directions and, in a sense, provides a seemingly endless canvas that can be used to surface content to the user in accordance with their navigation activities.

In at least some embodiments, the intelligent adaptive content canvas is configured to interleave and present content from a variety of sources including local content sources and remote content sources.

Alternately or additionally, in at least some other embodiments, the intelligent adaptive content canvas provides an adaptive template that is created as a function of various characteristics associated with the content. The adaptive template is created to include content-fillable containers. The characteristics and properties of the content-fillable containers are selected based upon various characteristics associated with the content that is to be used to fill the containers.

In at least some embodiments, the intelligent adaptive content canvas utilizes predictive directional queuing to intelligently select which content-fillable containers to select, as well as which content to place into the content-fillable containers. The queuing is directional in the sense that content-fillable containers are filled with relevant content based, at least in part, on a navigational direction employed by the user to navigate the intelligent adaptive content canvas.

In at least some embodiments, the intelligent adaptive content canvas utilizes a history-based approach that selects content for populating the content-fillable containers based, at least in part on a user's actions and/or behavior, to intelligently tune the user experience. In this manner, more or less of certain types of content can be utilized to fill the content-fillable containers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Various embodiments provide an intelligent adaptive content canvas that can enable users to access content, such as photos and videos, and consume the content in an adaptive environment that tailors the user experience in accordance with various parameters. The user experience is personalized to the user and is adaptively predictive in a manner that attempts to surface content that the user would likely wish to consume.

The intelligent adaptive content canvas is also navigable in various directions and, in a sense, provides a seemingly endless canvas that can be used to surface content to the user in accordance with their navigation activities.

The intelligent adaptive content canvas can be configured to interleave and present content from a variety of sources including local content sources and remote content sources. The intelligent adaptive content canvas can also provide an adaptive template that is created as a function of various characteristics associated with the content. The adaptive template is created to include content-fillable containers. The characteristics and properties of the content-fillable containers are selected based upon various characteristics associated with the content that is to be used to fill the containers.

The intelligent adaptive content canvas can also utilize predictive directional queuing to intelligently select which content-fillable containers to select, as well as which content to place into the content-fillable containers. The queuing is directional in the sense that content-fillable containers are filled with relevant content based, at least in part, on a navigational direction employed by the user to navigate the intelligent adaptive content canvas.

The intelligent adaptive content canvas can be configured to utilize a history-based approach that selects content for populating the content-fillable containers based, at least in part, on a user's actions and/or behavior to intelligently tune the user experience. In this manner, more or less of certain types of content can be utilized to fill the content-fillable containers.

In the following discussion, an example environment is first described that may employ the techniques described herein. Example embodiments and procedures are then described which may be performed in the example environment as well as other environments. Consequently, performance of the example procedures is not limited to the example environment and the example environment is not limited to performance of the example procedures.

Example Environment

Figure 1:
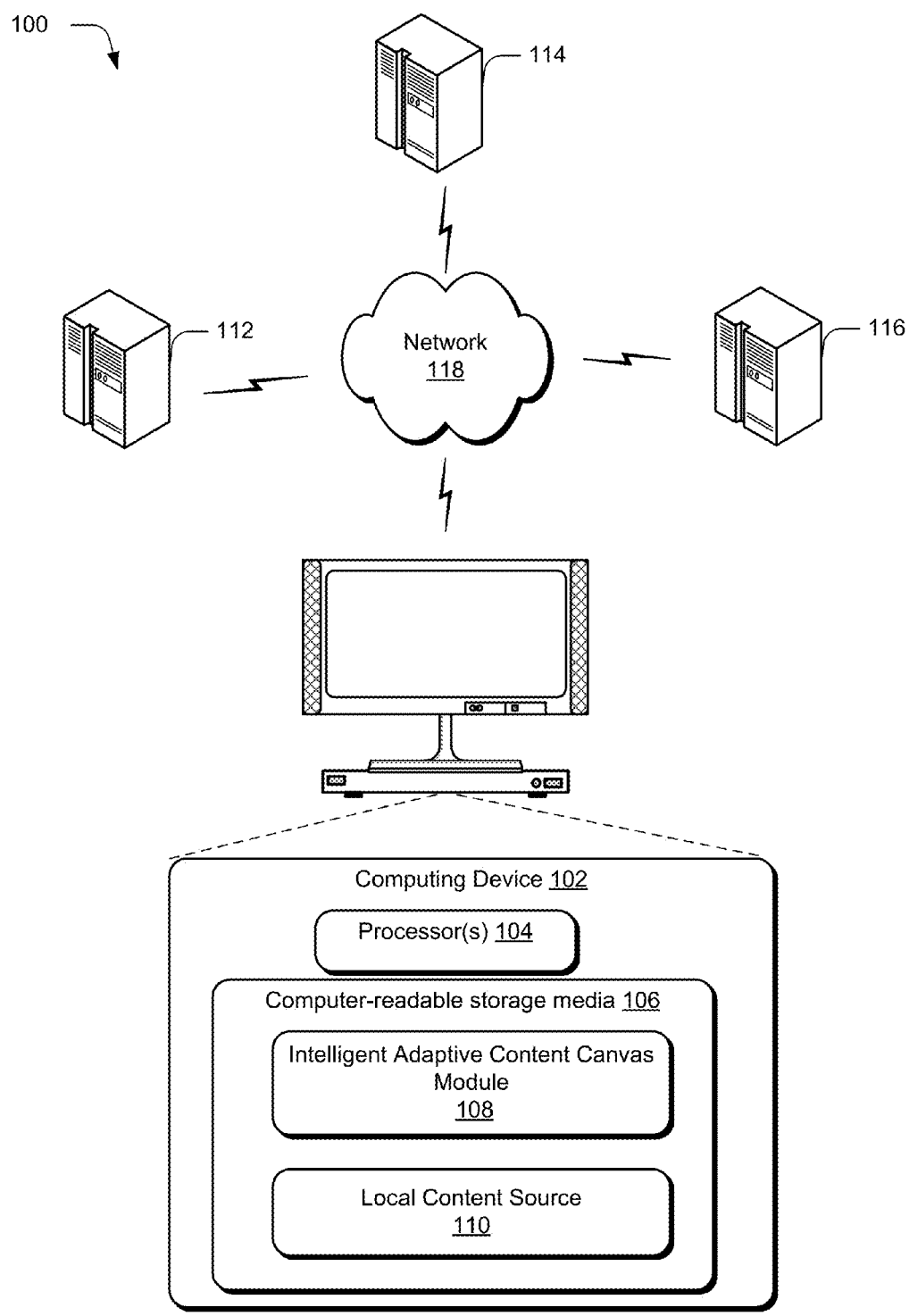
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 including one or more processors 104, one or more computer-readable storage media 106, an intelligent adaptive content canvas module 108 embodied on the computer-readable storage media 106, and a local content source 110 also embodied on the computer-readable storage media 106. The intelligent adaptive content canvas module 108 is configured to operate as described above and below.

The computing device 102 can be configured as any suitable type of computing device. For example, the computing device may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 14.

The environment 100 also includes one or more servers 112, 114, and 116 configured to communicate with computing device 102 over a network 118, such as the Internet, to provide a "cloud-based" computing environment. The servers 112, 114, and 116 can provide a variety of functionality including, by way of example and not limitation, serving as a remote content source that can be utilized to provide content to computing device 102 for use by the intelligent adaptive content canvas module 108, as described above and below. The servers can provide various Web-based services such as social networking services, content-sharing services, content storage sources, and the like.

The intelligent adaptive content canvas module 108 can enable users to access content, such as photos and videos, and consume the content in an adaptive environment that tailors the user experience in accordance with various parameters. The user experience is personalized to the user and is adaptively predictive in a manner that attempts to surface content that the user would likely wish to consume.

The intelligent adaptive content canvas module 108 can do so by supporting various functionality including, by way of example and not limitation: permitting content canvas navigation in various directions in conjunction with surfacing content in accordance with navigation activities; interleaving and presenting content from a variety of local and/or remote sources; providing an adaptive template that is created as a function of various characteristics associated with a user's content; utilizing predictive directional queuing to intelligently select which content-fillable containers to select, as well as which content to place into the content-fillable containers; and/or utilizing a history-based approach that selects content for populating the content-fillable containers based, at least in part, on a user's actions and/or behavior.

Figure 2:
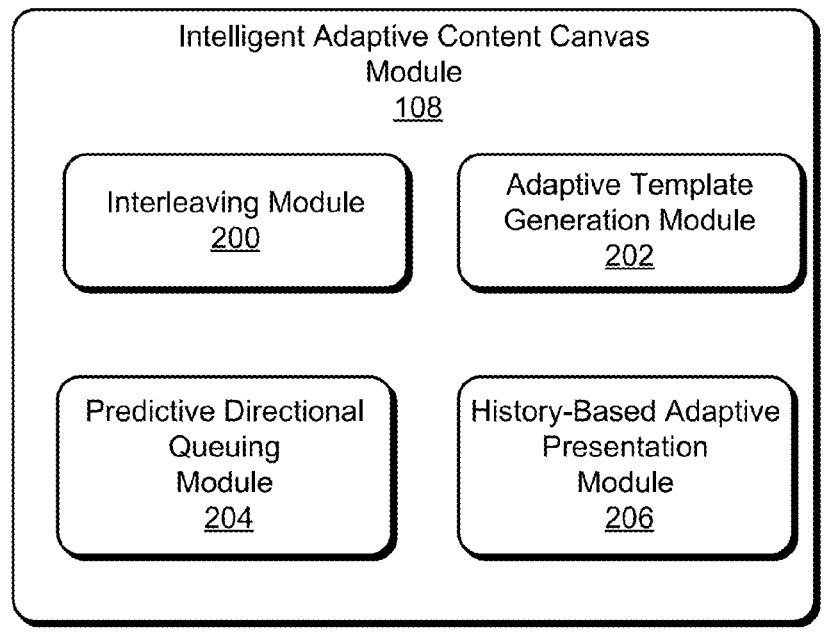
FIG. 2 illustrates an intelligent adaptive content canvas module in accordance with one or more embodiments.

FIG. 2 illustrates intelligent adaptive content canvas module 108 in accordance with one or more embodiments. In this example, the intelligent adaptive content canvas module 108 includes an interleaving module 200, an adaptive template generation module 202, a predictive directional queuing module 204 and a history-based adaptive presentation module 206, each of which is described below in its own section or sub-section. It is to be appreciated and understood that while these particular modules are shown as separate modules, the functionality associated with each can be utilized in conjunction with one or more of the other modules to provide a rich, integrated user experience.

Intelligent Adaptive Content Canvas—108

The intelligent adaptive content canvas module 108 can enable users to access content, such as photos and videos, and consume the content in an adaptive environment that tailors the user experience in accordance with various parameters. In at least some embodiments, the intelligent adaptive content canvas module 108 provides a content canvas that is navigable in various directions and, in a sense, provides a seemingly endless canvas that can be used to surface content to the user in accordance with their navigation activities.

Figure 3:
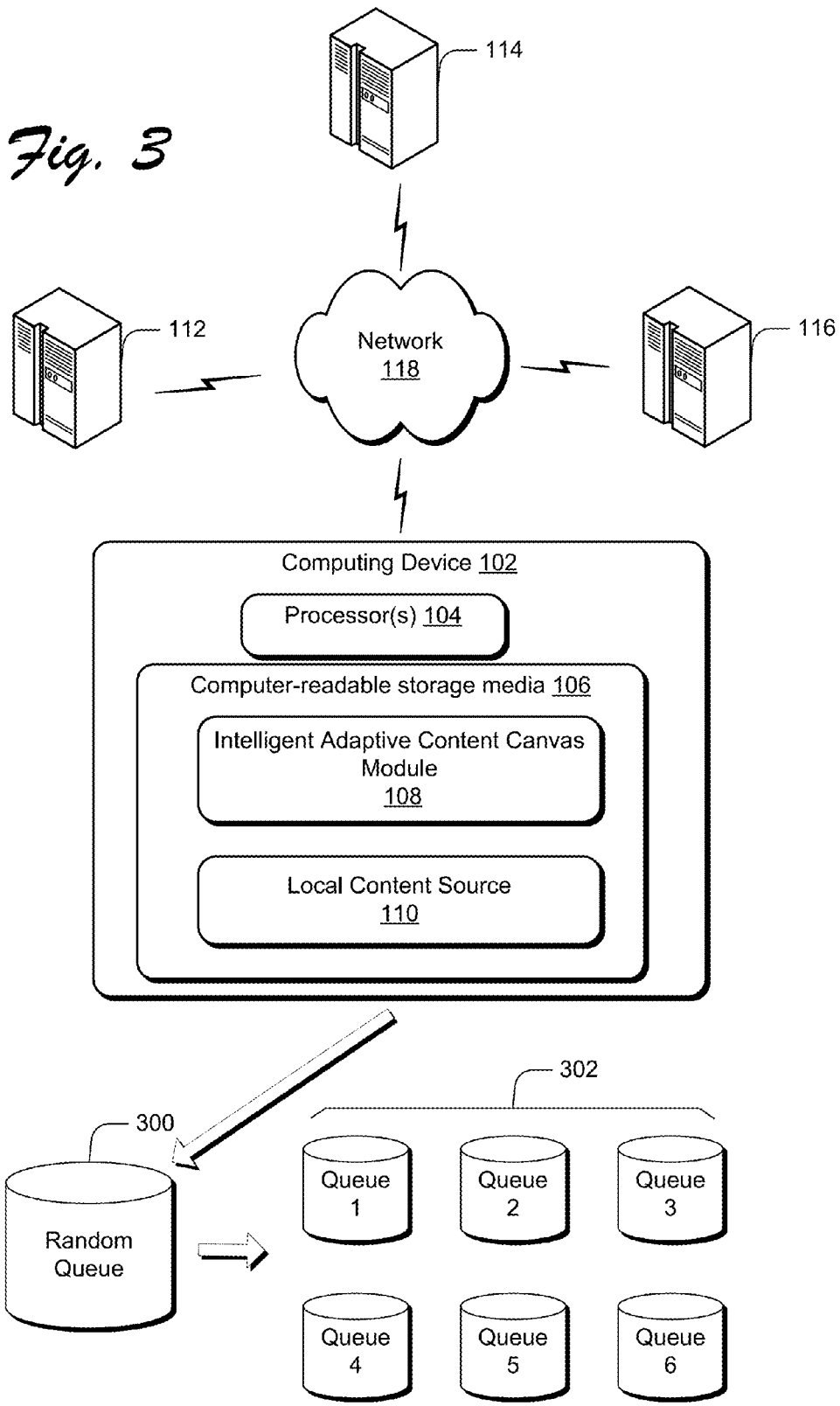
FIG. 3 illustrates an example system in accordance with one or more embodiments.

As an example, consider FIG. 3 which shows aspects of the system of FIG. 1, where like numerals depict like components. In at least some embodiments, when a user logs into their computer, they can start or launch the intelligent adaptive content canvas module 108 to begin their content consumption experience. The user can also sign into various remote sources where their content may be stored, here represented by services that can be hosted by servers 112, 114, and 116. Remote sources can include social networking sites, content aggregation sites, content storage sites, and the like. The user can also access locally stored content from a local content source 110. The intelligent adaptive content canvas module can then begin pulling content from these various sources as described below.

This content, whether stored locally or remotely, can be considered as user-specific content. User-specific content should be understood to be different from more generalized content such as application icons, website favicons and the like, that might be used across a large number of users.

With respect to remote content sources, the intelligent adaptive content canvas module 108 can be configured to save access tokens associated with the remote content sources so that in subsequent sessions, the user can be automatically logged into their respective services so that the content can be pulled from the services without having the user necessarily log into the services. Alternately or additionally, content that is pulled from these services can be cached locally so that in subsequent sessions, the cached content need not be pulled from the services.

As content or content representations (such as unique IDs, content metadata, URIs, service provider specific unique IDs, and the like) are received from remote and/or local content sources, the content or content representations are placed into a random queue 300. In one or more embodiments, content or content representations that are placed into the random queue 300 can constitute unclassified content—that is, content that has not yet been analyzed to provide a classification. Content or content representations that reside in the random queue 300 constitute randomized content that can be used to randomly fill content-fillable containers, as will become apparent below.

Once the content or content representations have been placed into random queue 300, the content can be analyzed to provide one or more classifications. Once classified, the content can then be used to fill the content-fillable containers. This can take place in any suitable way. For example, classified content can be pulled directly from the random queue. Alternately, classified content can be placed into or otherwise associated with one or more specific queues, here represented collectively at 302. In embodiments where content representations (and not the actual content) are used to represent content in the random queue, the content can be loaded during analysis and placed into the appropriate specific queues. Specific queues can be classified in any suitable way. For example, specific queues may exist for "important" content, "family" content, "friend" content, "album" content, and the like.

Content can be analyzed in any suitable way and at any suitable time. For example, content can be analyzed as it is streamed from its source and received. Alternately or additionally, the content can be analyzed as the intelligent adaptive content canvas module 108 processes content for placement into the specific queues. Alternately or additionally, content representations can be used, as noted above, to represent content in the random queue. Then, at content analysis time, content can be pulled from its source using the content representations, analyzed and placed into the appropriate specific queue(s).

Content analysis can include, by way of example and not limitation, analyzing whether the content is in portrait or landscape view, whether the content has a particular degree or level of importance (e.g., high importance, medium importance, or low importance), whether the content is in high or low resolution, and the like. Other analysis techniques can be utilized without departing from the spirit and scope of the claimed subject matter, as described in more detail below. In one or more embodiments, after the analysis is complete, the analysis results are stored in an analysis database so that content that has already been analyzed is not re-analyzed. Now, in subsequent sessions when content or content representations are pulled from the random queue, the analysis database is checked to ascertain whether the content has been analyzed. If so, the content can be placed directly in the appropriate specific queue. If the content has not been analyzed, it can be analyzed and then placed in the appropriate specific queue.

Figure 4:
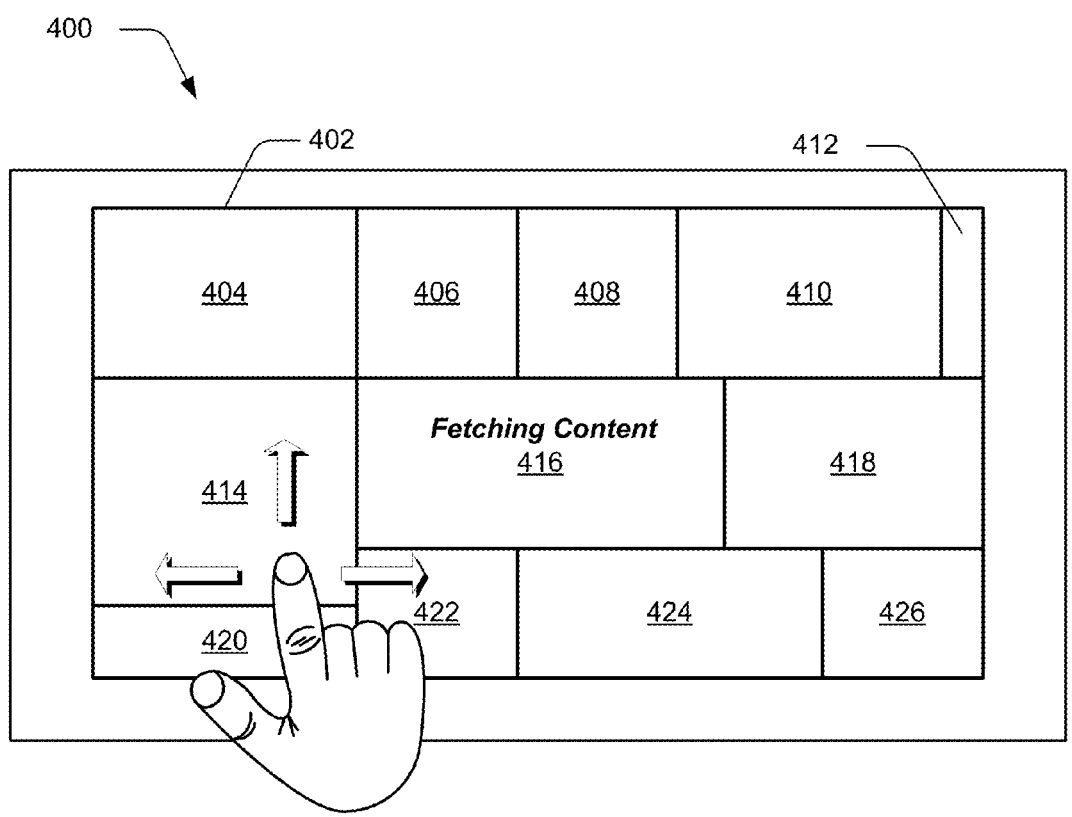
FIG. 4 illustrates an example computing device in accordance with one or more embodiments.

As an example of content-fillable containers, consider FIG. 4. There, a computing device in the form of a touch-enabled, tablet computer is shown generally at 400 and includes a display screen 402. A plurality of blank, content-fillable containers are shown at 404, 406, 408, 410, 412, 414, 416, 418, 420, 422, 424, and 426. The content-fillable containers collectively make up a template that is to be filled with user-specific content. In addition, a notification "Fetching Content" may be displayed to notify the user that content is currently being fetched and/or analyzed to fill the content-fillable containers. In this example, the display screen 402 includes complete containers such as containers 404 and 406, and partial containers such as containers 412 and 420 that can be accessed by scrolling in a particular direction. For example, the user can scroll left and right horizontally, as well as up and down vertically in the direction of the indicated arrows.

In embodiments that do not employ specific queues, content can be pulled from the random queue 300 (FIG. 3) and randomly placed into appropriately-sized, content-fillable containers. In embodiments that utilize both a random queue and specific queues, when the content or its representation is pulled from the random queue 300, if it has not already been analyzed, it can be analyzed at that time for purposes of placement into a particular content-fillable container, e.g., based on content dimensions, format, etc. . . . . Alternately or additionally, if the content has been previously analyzed and classified, the content can be pulled from an appropriate specific queue, such as one of those shown at 302 in FIG. 3.

In the illustrated and described embodiment, as a user scrolls through the content canvas, new templates are generated in a scrolling or navigation direction and contain content-fillable containers which can be subsequently filled with content from the random queue 300 or one of the specific queues. For example, if the user scrolls to the right, those containers that have been filled with content would move visually to the left with new additional containers moving in from the right, with the additional content-fillable containers being generated to be visually contiguous with those containers that have been filled with content. These additional content-fillable containers can be filled with content selected from either the random queue 300 or one of the specific queues. The same holds true if the user were to scroll or navigate to the left or up and down. In this manner, the intelligent adaptive content canvas module 108 provides a seemingly endless canvas that can be used to surface content to the user in accordance with their navigation activities.

Figure 5:
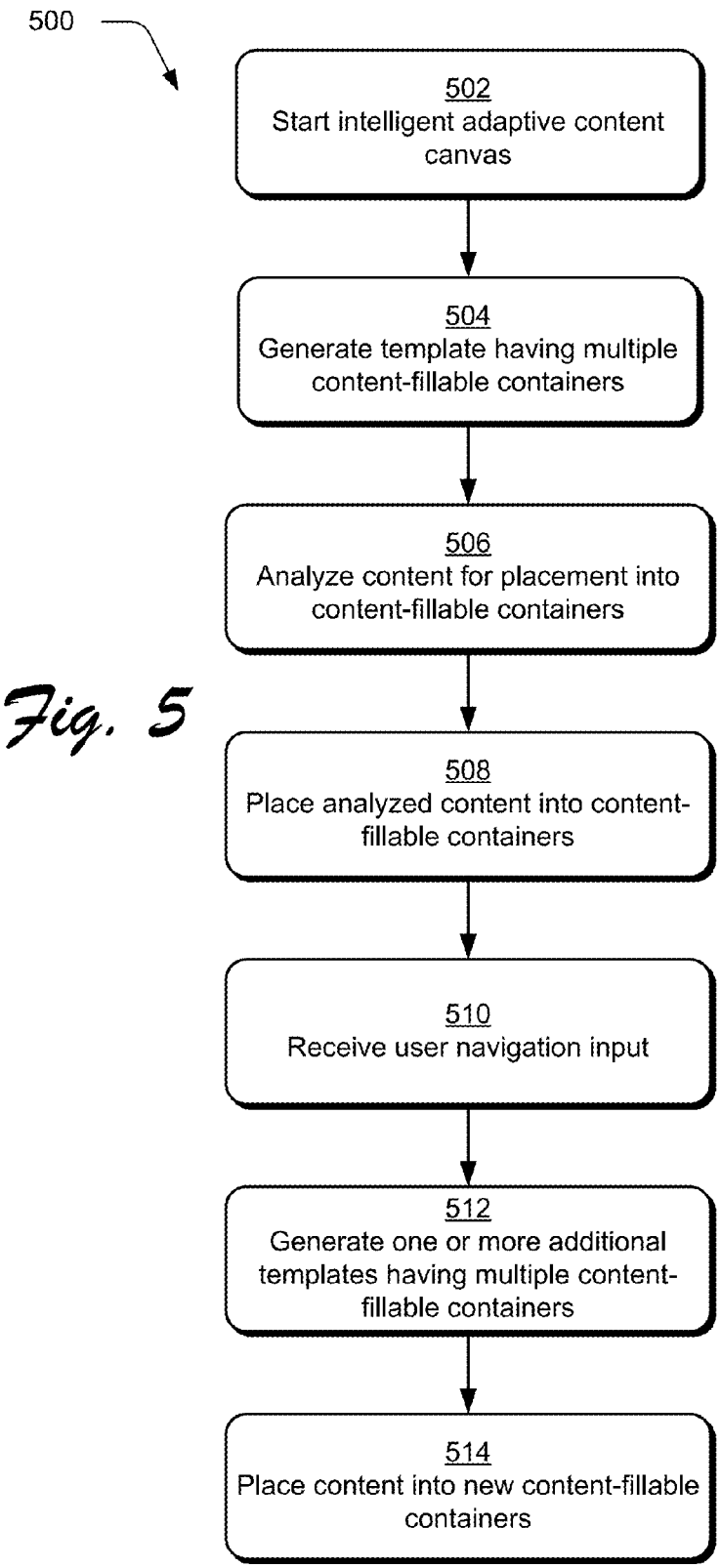
FIG. 5 is a flow diagram depicting a procedure in an example implementation in accordance with one or more embodiments.

FIG. 5 depicts a procedure 500 in an example intelligent adaptive content canvas implementation in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks.

At block 502, the intelligent adaptive content canvas is started. This step can be performed by receiving a user input and, responsive to receiving the user input, launching the intelligent adaptive content canvas module 108 (FIG. 1). A template is generated (block 504) having multiple content-fillable containers. An example of a template and content-fillable containers is provided above. Content is analyzed, at block 506, for placement into the content-fillable containers. This operation can be performed in any suitable way. For example, in at least some embodiments, this operation can be performed as content is pulled from one or more sources including, by way of example and not limitation, one or more local content sources and/or one or more remote content sources. Alternately or additionally, this operation can be performed as content is pulled from one or more queues for purposes of filling the content-fillable containers, such as a random queue or one or specific queues.

Analyzed content is placed into content-fillable containers, at block 508, effective to enable viewing of the content. This operation can be performed by placing images or photos into the content-fillable containers. Alternately or additionally, this operation can be performed by placing video content in one or more of the content-fillable containers. A user navigation input is received at block 510. This operation can be performed in any suitable way. For example, this operation can be performed responsive to receiving a touch input, by way of a navigation gesture, to navigate the content canvas. Alternately or additionally, this operation can be performed by receiving device input, such as a mouse or stylus input, to navigate the content canvas. Alternately or additionally, this operation can be performed by receiving input by way of a natural user interface (NUI) in which a non-touch, gestural input is received. Such gestural input may take the form of a "swipe in space" that is captured by a device camera and recognized to be a navigation input.

Responsive to receiving the user navigation input, one or more additional templates having multiple content-fillable containers are generated at block 512. Responsive to generating the additional template or templates, additional content is placed into the new content-fillable containers, at block 514, effective to enable viewing of the additional content. This operation can include analyzing content for placement into the new content-fillable containers as the content is pulled from one or more queues, such as the random queue 300 (FIG. 3) or one or more specific queues.

Having generally considered an intelligent adaptive content canvas module 108 in accordance with one or more embodiments, consider now some additional features that can be supported by the intelligent adaptive content canvas module. It is to be understood and appreciated, as noted above, that the various embodiments described in this document can be incorporated for use together. For example, the functionality provided by the interleaving module can be used in combination with the functionality provided by the predictive directional queuing module, and so forth, as will become apparent below.

Interleaving Module—200

As noted above, users can have content such as photos and video located in or at a variety of different sources. These sources can include, by way of example and not limitation, various Internet sources that offer web services, in local content sources such as a hard drive or phone camera roll, and the like. In some cases, viewing all of this different content separately can be useful, but it can also be problematic because the user must go to each particular source of content to consume their content. In one or more embodiments, the intelligent adaptive content canvas module 108 (FIG. 1) is configured, through interleaving module 200, to interleave and present content from a variety of sources including one or more local content sources 110 and remote content sources, represented by servers 112, 114, and 116 (FIG. 1). The can be performed automatically at start up, as well as during navigational activities.

In one or more embodiments, the user can be given an option, through a suitably-configured user interface instrumentality, to toggle on or off each source of content. In this way, the user can specifically direct sources from which content is to be pulled for purposes of filling the content-fillable containers. So, for example, the user may have multiple local content sources, as well as multiple remote content sources from which to select. In these embodiments, the user can selectively enable or disable one or more sources from which content is to be pulled or used to fill the content-fillable containers. In at least some embodiments, if a content source is disabled, the intelligent adaptive content canvas module 108 can process content within its queues and either flag content associated with sources that have been disabled or remove such content from its queues.

Figure 6:
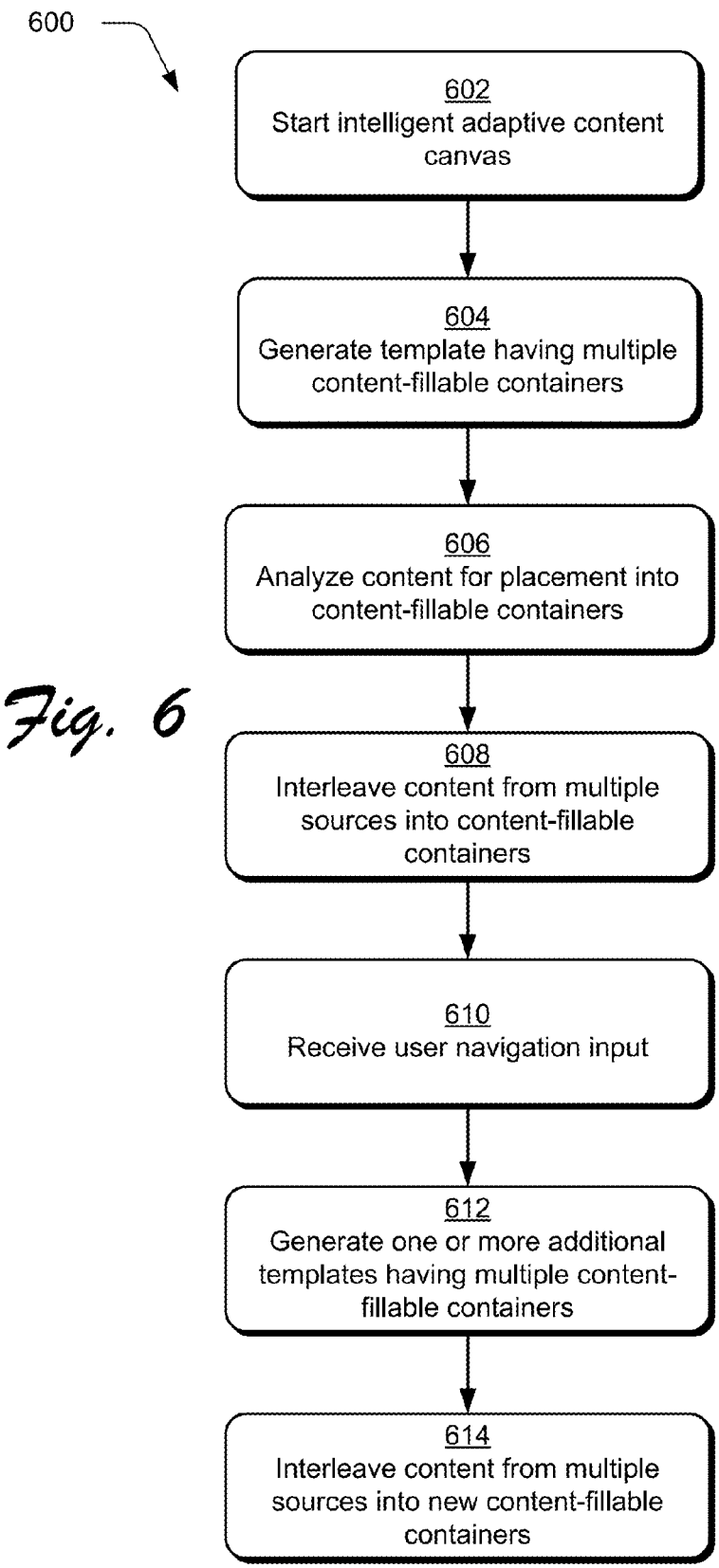
FIG. 6 is a flow diagram depicting a procedure in an example implementation in accordance with one or more embodiments.

FIG. 6 depicts a procedure 600 in an example intelligent adaptive content canvas implementation in which content from disparate sources can be interleaved in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks.

At block 602, the intelligent adaptive content canvas is started. This step can be performed by receiving a user input and, responsive to receiving the user input, launching the intelligent adaptive content canvas module 108 (FIG. 1). At block 604 a template is generated having multiple content-fillable containers. An example of a template and content-fillable containers is provided above. Content is analyzed, at block 606, for placement into the content-fillable containers. This operation can be performed in any suitable way. For example, in at least some embodiments, this operation can be performed as content is pulled from one or more sources including, by way of example and not limitation, one or more local content sources and/or one or more remote content sources. Alternately or additionally, this operation can be performed as content is pulled from one or more queues for purposes of filling the content-fillable containers. This operation can also be performed as part of the process that fills the specific queues. This operation can also be performed by excluding content from sources that have been disabled by the user.

Content from multiple sources is interleaved, at block 608, into content-fillable containers. This operation can be performed by placing images or photos into the content-fillable containers. Alternately or additionally, this operation can be performed by placing video content in one or more of the content-fillable containers. The multiple sources can include one or more remote sources and/or one or more local sources such as a hard drive, camera roll, external storage device, and the like.

A user navigation input is received at block 610. Examples of how this operation can be performed are provided above. Responsive to receiving the user navigation input, one or more additional templates having multiple content-fillable containers are generated at block 612. Responsive to generating the additional template or templates, content from multiple sources is interleaved into the new content-fillable containers at block 614. This operation can include analyzing content for placement into the new content-fillable containers as the content is pulled from one or more queues, such as the random queue 300 (FIG. 3) or one or more specific queues.

Having generally considered an interleaving module 200 in accordance with one or more embodiments, consider now an adaptive template generation module in accordance with one or more embodiments.

Adaptive Template Generation Module—202

In one or more embodiments, the intelligent adaptive content canvas module 108, through its adaptive template generation module 202 (FIG. 2), provides an adaptive template that is created as a function of various characteristics associated with the content. The adaptive template is created to include content-fillable containers. The characteristics and properties of the content-fillable containers are selected based upon various characteristics associated with the content that is to be used to fill the containers. That is, instead of using a pre-generated content template, the adaptive template is created based upon characteristics associated with content that is to be used to fill the containers.

In one or more embodiments, content that is received from various sources, such as remote content sources and/or local content sources, can be analyzed as described above and placed into appropriate queues. The analysis can include ascertaining various characteristics associated with the content that is to be used to fill the containers. For example, the content-fillable containers can have various sizes ranging from larger content-fillable containers to smaller content-fillable containers. Based on the characteristics ascertained through analysis of the content (such as content size), container sizes can be selected to customize the content template to the specific content that has been analyzed. The types of containers, container arrangement and/or frequency can be based on the content's specific characteristics. The result is a generated unique template that is specifically adapted to the user's content. Further, the template and additional templates can be incrementally generated to support streaming download of the user's content as well as the user's navigation activities as described above.

As an example, consider the following. When the content is analyzed, a level of importance can be assigned to the content. Any suitable criteria can be utilized to assign a level of importance to the user's content. For example, individual pieces of content may have characteristics embodied by metadata that can be analyzed to ascertain the content's level of importance. Metadata can include, by way of example and not limitation, the presence of "likes" or number of "likes", the presence of or number of comments, and/or the presence of or number of tags, to name just a few. Other content characteristics can include the content's organization in albums (e.g., a particular photo may appear in multiple albums), album size (e.g., the "family" album is much larger than any other album), specifically tagged individuals or groups (e.g. "dad" and "family" are tagged more frequently than other individuals), location associated with the content (Cannon Beach photos outnumber Montana photos by 10-to-1), and the like.

Figure 7:
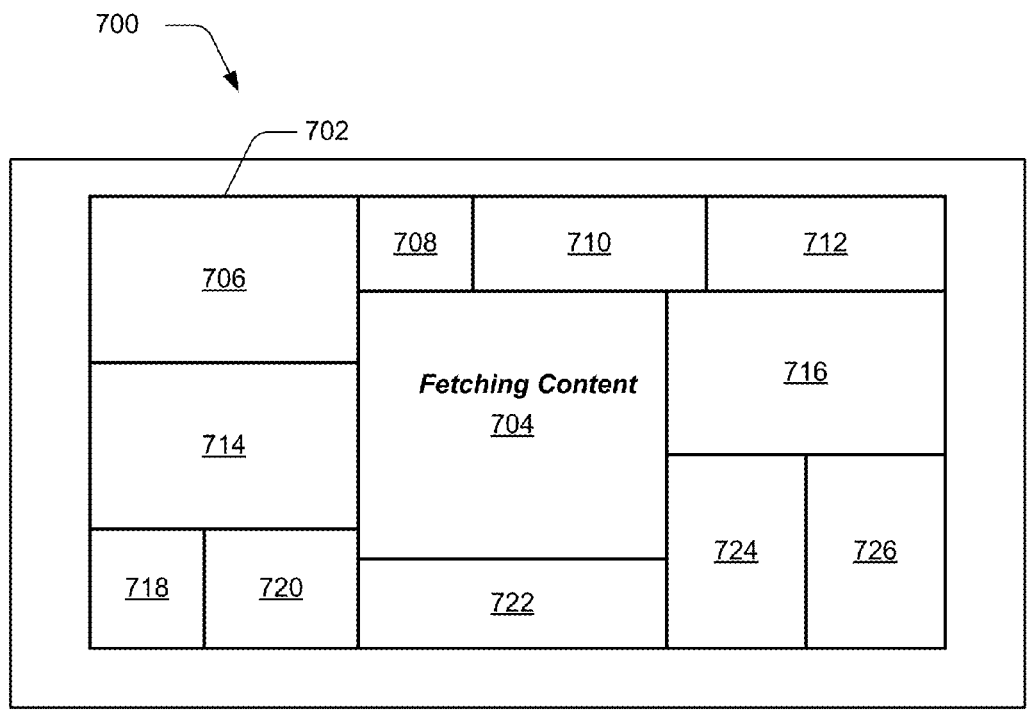
FIG. 7 illustrates an example computing device in accordance with one or more embodiments.

Once a level of importance has been assigned to the user's content, an intelligent adaptive decision can be made to generate a content template that is customized to the level of importance of the user's collective content. For example, assume that of the content that has been analyzed and leveled, 8% of the content has a high level of importance and 92% of the content has a low or lesser level of importance. Based on the importance distribution, a content template can be generated to reflect the importance distribution. For example, roughly 8% of the content-fillable containers can be generated to have a large size, and roughly 92% of the content fillable containers can be generated to have a smaller size. As an example, consider FIG. 7.

There, a computing device in the form of a touch-enabled, tablet computer is shown generally at 700 and includes a display screen 702. A plurality of blank, content-fillable containers are shown at 704, 706, 708, 710, 712, 714, 716, 718, 720, 722, 724, and 726. In addition, a notification "Fetching Content" is displayed to notify the user that content is currently being fetched to fill the content-fillable containers. As in the above example, the user can scroll left and right horizontally, as well as up and down vertically.

In this example, notice that content-fillable container 704 is larger in size than the other content-fillable containers. Notice also that content-fillable container 704 is placed in the center of the display screen 702, while smaller content-fillable containers have been filled in around content-fillable container 704. In one or more embodiments, the smaller content-fillable containers can have the same size or can be varying in size, as illustrated here. The size variance of the content-fillable containers can be a function of the relative importance levels of the content that is going to be placed therein. For example, content-fillable container 716 is associated with content that has an importance level that is less than the importance level of content to be placed into content-fillable container 704, but greater than the importance level of content that is to be placed into content-fillable containers 708.

In the illustrated and described embodiment, as a user scrolls through the content canvas, new templates are generated that contain content-fillable containers which can be subsequently filled with content. In one or more embodiments, as more and more content is received from the various content sources and analyzed, the distribution of importance levels can change which, in turn, can change the sizes and distributions of the content-fillable containers. For example, if the relative number of highly important pieces of content increases, the relative number of larger-sized containers would increase as well.

Figure 8:
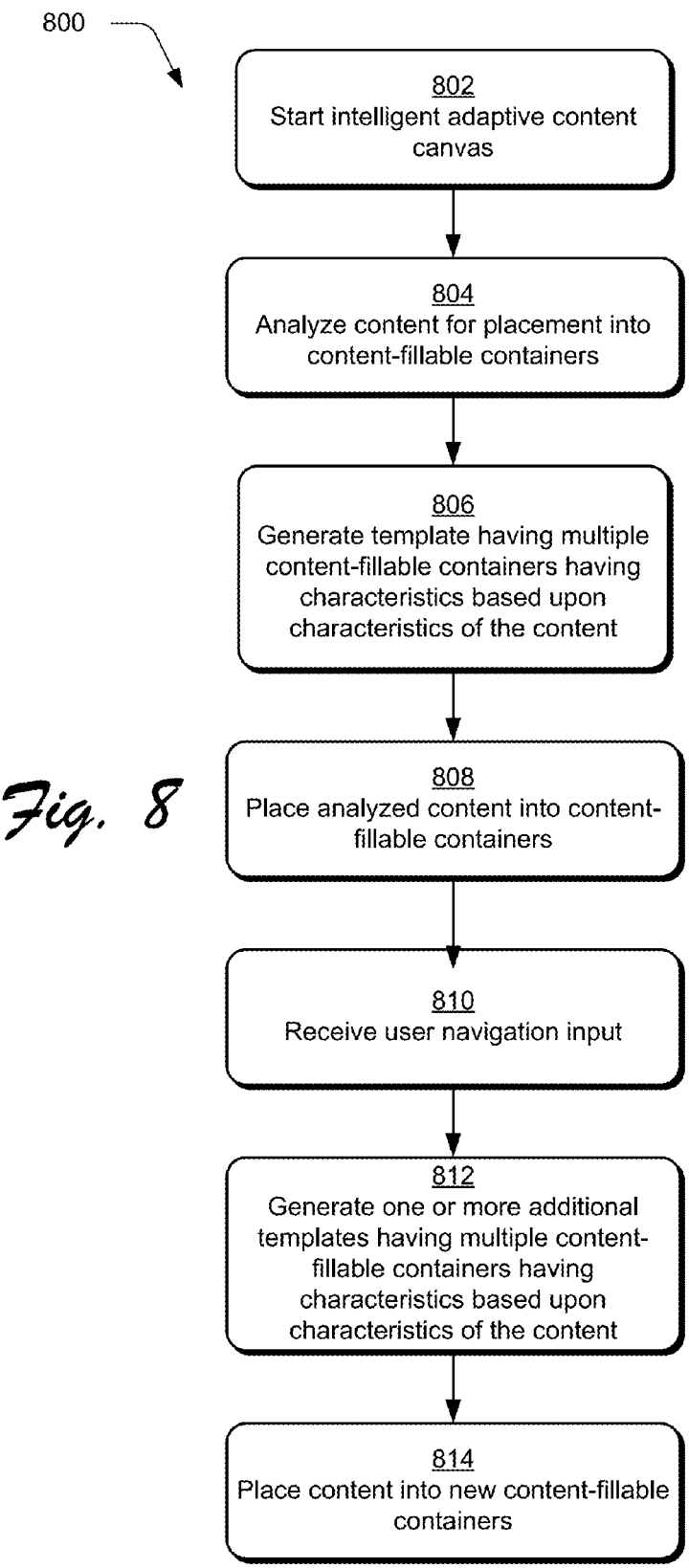
FIG. 8 is a flow diagram depicting a procedure in an example implementation in accordance with one or more embodiments.

FIG. 8 depicts a procedure 800 in an example adaptive template generation implementation in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks.

At block 802, the intelligent adaptive content canvas is started. This step can be performed by receiving a user input and, responsive to receiving the user input, launching the intelligent adaptive content canvas module 108 (FIG. 1). Content is analyzed for placement into content-fillable containers at block 804. This operation can be performed in any suitable way. For example, the content can be analyzed to ascertain various characteristics associated with the content. Any suitable characteristics can form the basis of the analysis that is conducted. The characteristics can include those characteristics listed above, as well as others. In at least some embodiments, this operation can be performed as content is pulled from one or more sources including, by way of example and not limitation, one or more local content sources and/or one or more remote content sources. Alternately or additionally, this operation can be performed as content is pulled from one or more queues for purposes of filling the content-fillable containers.

A template having multiple content-fillable containers having characteristics based upon characteristics of the analyzed content is generated at block 806. Examples of how this can be done are provided above.

Analyzed content is placed into the content-fillable containers at block 808. This operation can be performed by placing images or photos into the content-fillable containers. Alternately or additionally, this operation can be performed by placing video content in one or more of the content-fillable containers.

A user navigation input is received at block 810. The operation can be performed in any suitable way. For example, this operation can be performed responsive to receiving a touch input, by way of a navigation gesture, to navigate the content canvas. Alternately or additionally, this operation can be performed by receiving device input, such as a mouse or stylus input, to navigate the content canvas. Alternately or additionally, this operation can be performed by receiving input by way of a natural user interface (NUI) in which a non-touch, gestural input is received. Such gestural input may take the form of a "swipe in space" that is captured by a device camera and recognized to be a navigation input.

Responsive to receiving the user navigation input, one or more additional templates having multiple content-fillable containers having characteristics based on characteristics of the analyzed content are generated at block 812. Responsive to generating the additional template or templates, content is placed into the new content-fillable containers at block 814.

Having considered an adaptive template generation module 202 in accordance with one or more embodiments, consider now a predictive directional queuing module in accordance with one or more embodiments.

Predictive Directional Queuing Module—204

When a user navigates content, it can take a long time to load in content that is newly in-view. In accordance with one or more embodiments, the predictive directional queuing module 204 is configured to predictively pre-fetch and pre-load content depending on the direction of navigation. For example, if the user is navigating from left-to-right at a particular speed, content can be pre-fetched and pre-loaded so that when a new template is displayed, content can be quickly populated into the content-fillable containers. For example, depending on the speed of the scrolling action and how many content-fillable containers fit onto the display screen, content to fill the content-fillable containers can be pre-fetched and pre-loaded into a new template in advance, before the new template comes into view. For example, if the user scrolls in a particular direction at a particular speed, the predictive directional queuing module 204 might ascertain that in the next 3 seconds, 50 additional pieces of content are going to be needed. As such, the 50 additional pieces of content can be pre-fetched and pre-loaded in advance. In some embodiments, the content can also be analyzed as part of the pre-fetching process to fill the specific queues. Now, when the user continues their scrolling action in the particular direction, content can be quickly and seamlessly populated into the content-fillable containers to provide a desirable user experience. This approach can be utilized in any of the embodiments described above and below.

In at least some embodiments, each scrolling direction (e.g., left, right, up, and down) is assigned a dimension having a spectrum of values. As the user navigates in a scrolling direction, content corresponding to the associated spectrum of values can be populated into the content-fillable containers. This can include pre-fetching, analyzing and pre-loading content in advance, as described above.

Figure 9:
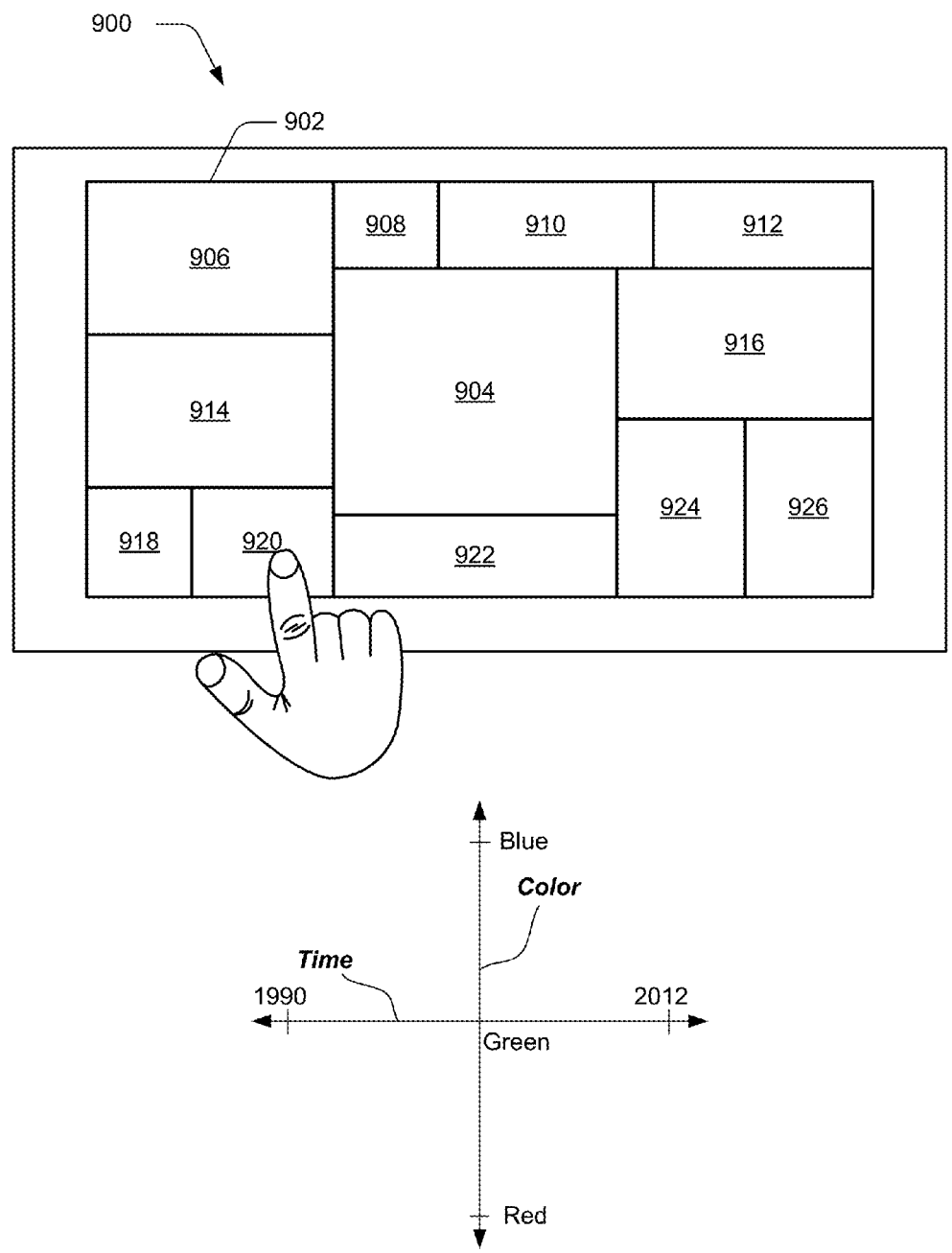
FIG. 9 illustrates an example computing device in accordance with one or more embodiments.

Any suitable type of dimensions can be utilized. By way of example and not limitation, dimensions can include time, friend closeness, content popularity, content location distance from a point, unsorted lists such as friends, albums, or events. Content can be analyzed, as described above, to ascertain content values that correspond to the spectrum values of a particular dimension. Any suitable type of content analysis can be utilized. As such, content values can be gleaned from metadata associated with the content and/or characteristics or properties of the content. As noted above, metadata can include things such as tags, likes, comments, and the like. Characteristics or properties of the content can include such things as subject matter of the content (e.g., people appearing in the content or various locations), content color, color distribution, color depth, and the like. As an example, consider FIG. 9.

There, a computing device in the form of a touch-enabled, tablet computer is shown generally at 900 and includes a display screen 902. A plurality of blank, content-fillable containers are shown at 904, 906, 908, 910, 912, 914, 916, 918, 920, 922, 924, and 926. As in the above example, the user can scroll left and right horizontally, as well as up and down vertically.

In addition, just below the computer, a two-dimensional graph is displayed having a dimension that corresponds to time (the X-axis) and a dimension that corresponds to color (the Y-axis). The spectrum of date values on the time axis ranges from 1990 to 2012. The spectrum of color values on the color axis ranges from red to blue.

In this example, as the user scrolls to the right, more recent content having a fixed color value is utilized to populate the content-fillable containers. Likewise, as the user scrolls to the left, less recent content having a fixed color value is utilized to populate the content-fillable containers. Similarly, as the user scrolls downward or upward, content having associated color values (with fixed time values) can be utilized to populate the content-fillable containers. If the user scrolls in a diagonal direction, a combination of spectrum values can be utilized to ascertain the content that is to be utilized to populate the content-fillable containers. For example, if the user scrolls diagonally upward to the right, more recent content having colors in that direction can be utilized to populate the content-fillable containers, (e.g., content from 2005 with mixtures of green and blue). Likewise, if the user scrolls diagonally downward to the left, less recent content having colors in that direction can be utilized to populate the content-fillable containers, (e.g. content from 1995 with mixtures of green and red).

In this manner, the user can be provided with an immersive visual exploration of graph structures that are extracted from their content.

Figure 10:
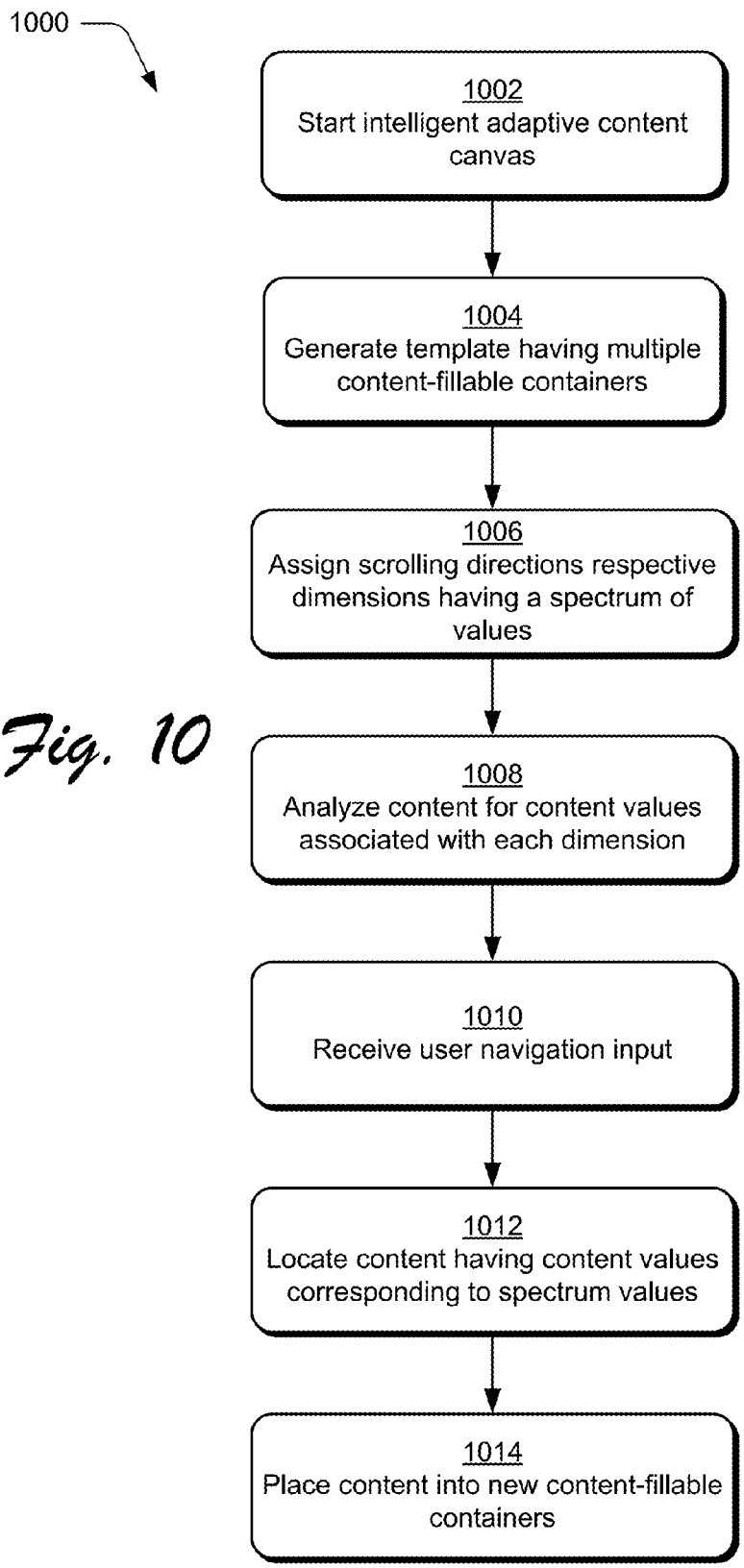
FIG. 10 is a flow diagram depicting a procedure in an example implementation in accordance with one or more embodiments.

FIG. 10 depicts a procedure 1000 in a predictive directional queuing implementation in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks.

At block 1002, the intelligent adaptive content canvas is started. This step can be performed by receiving a user input and, responsive to receiving the user input, launching the intelligent adaptive content canvas module 108 (FIG. 1). A template having multiple content-fillable containers is generated and filled with content at block 1004. An example of a template and content-fillable containers is provided above.

Scrolling directions are assigned respective dimensions having a spectrum of values at block 1006. An example of how this can be done is provided above. In addition, this operation can be performed prior to starting the intelligent adaptive content canvas at block 1002. Alternately or additionally, this step can be performed responsive to a user specifying individual dimensions for the scrolling dimensions. For example, a user may select an album dimension and a friend dimension to see photos from a spectrum of particular albums and a spectrum of their friends.

At block 1008, content is analyzed for content values associated with each dimension. This operation can be performed in any suitable way. For example, in at least some embodiments, this operation can be performed as content is pulled from one or more sources including, by way of example and not limitation, one or more local content sources and/or one or more remote content sources. Alternately or additionally, this operation can be performed as content is pulled from one or more queues for purposes of filling the content-fillable containers.

At block 1010, a user navigation input is received. The operation can be performed in any suitable way. For example, this operation can be performed responsive to receiving a touch input, by way of a navigation gesture, to navigate the content canvas. Alternately or additionally, this operation can be performed by receiving device input, such as a mouse or stylus input, to navigate the content canvas. Alternately or additionally, this operation can be performed by receiving input by way of a natural user interface (NUI) in which a non-touch, gestural input is received. Such gestural input may take the form of a "swipe in space" that is captured by a device camera and recognized to be a navigation input.

At block 1012, content is located having content values corresponding to the spectrum values in one or more of the dimensions of navigation. In one or embodiments, this operation can be performed by pulling the content from specific queues that correspond to the spectrum values. At block 1014, content is placed into the new content-fillable containers that have been generated responsive to the navigation input. This operation can be performed by placing images or photos into the content-fillable containers. Alternately or additionally, this operation can be performed by placing video content in one or more of the content-fillable containers.

Figure 11:
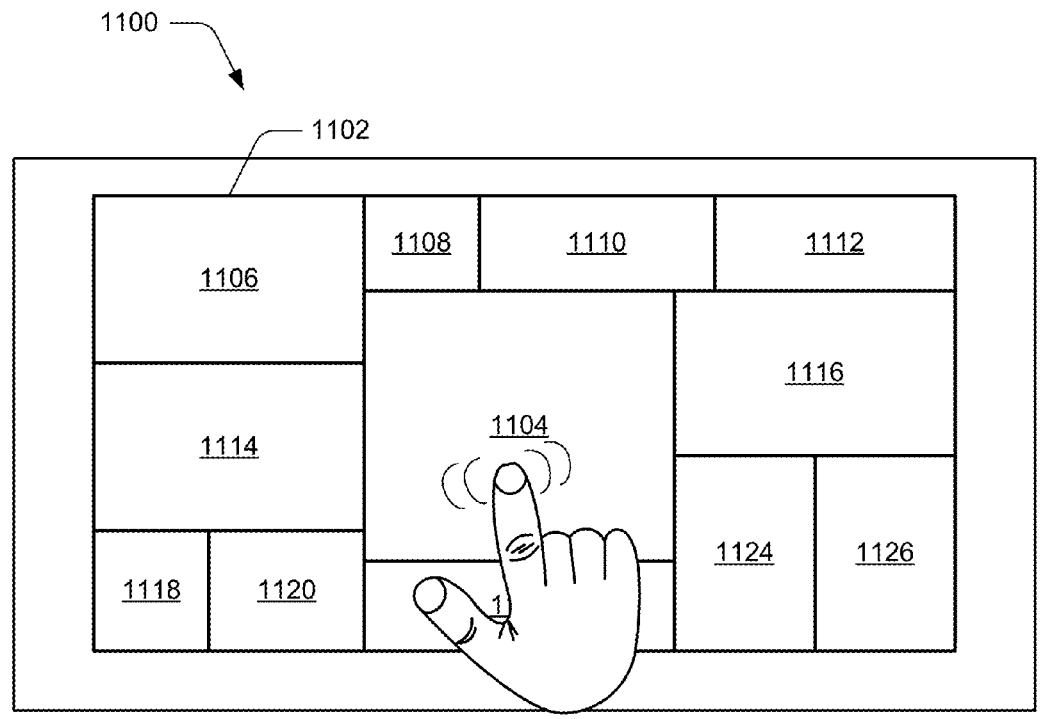
FIG. 11 illustrates an example computing device in accordance with one or more embodiments.
Figure 11:
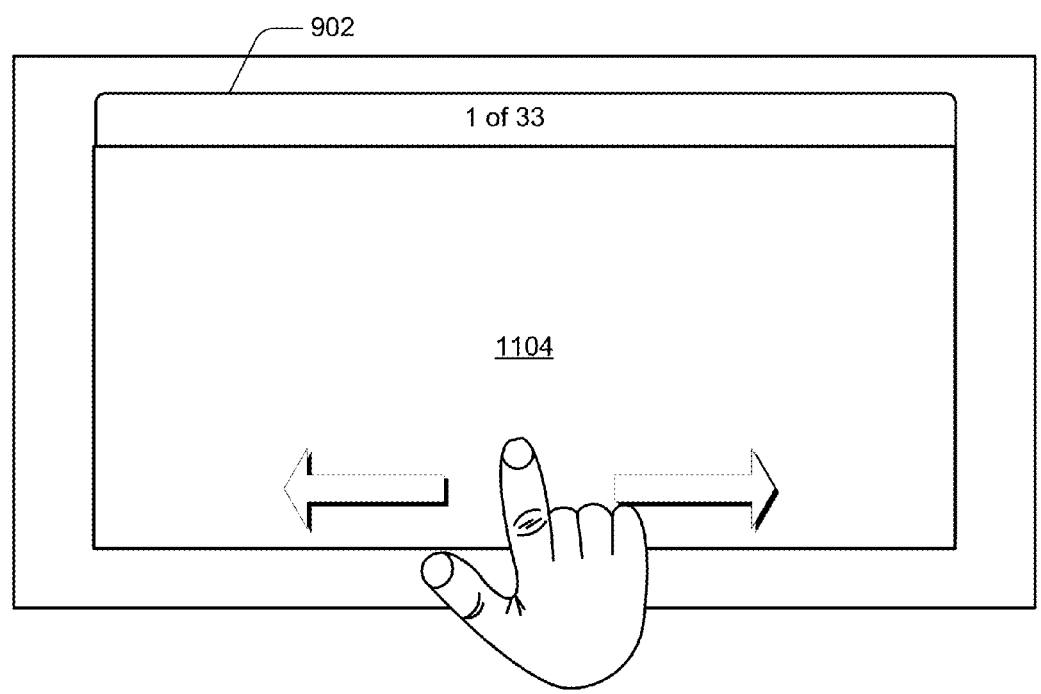

In one or more embodiments, a user can provide an input, such as a tap input, to enlarge a particular piece of content, such as a photo. When the photo is enlarged, the user experience moves from that of the canvas experience described above, to a "filmstrip" type experience. By enlarging a particular piece of content, an assumption is made that the user is interested in that piece of content and other related pieces of content. The pieces of content can be related in any suitable way. For example, these other related pieces of content may be temporally related in that they were created at or around the same time. Alternately or additionally, the related pieces of content may be related by virtue of the fact that they reside in the same album, folder, or location. During the filmstrip type experience, content is pulled from a different location, e.g. a different queue, than content was pulled for the canvas experience. For example, content can be pulled from the same album, folder or location. Once the user has enlarged a piece of content, they can now navigate left and right to view their other related content. As an example, consider FIG. 11.

There, a computing device in the form of a touch-enabled, tablet computer is shown generally at 1100 and includes a display screen 1102. A plurality of blank, content-fillable containers are shown at 1104, 1106, 1108, 1110, 1112, 1114, 1116, 1118, 1120, 1122, 1124, and 1126. As in the above example, the user can scroll left and right horizontally, as well as up and down vertically.

In this particular example, the user has selected content appearing in container 1104 by tapping on the content to cause it to be enlarged. This is shown in the bottom-most illustration of the computing device. Notice that content appearing within container 1104 has been enlarged to fill the entire screen. By selecting the content as described, the user experience is transitioned from a content canvas experience as described above, to a "filmstrip" type experience. In the filmstrip type experience, the user can navigate to the left and to the right to view content that is related to the enlarged content. The related content can be pulled from a source separate from the sources from which content was pulled to fill the content canvas. Alternately, the related content can be pulled from a single source of the multiple sources from which content was pulled to fill the content canvas.

Figure 12:
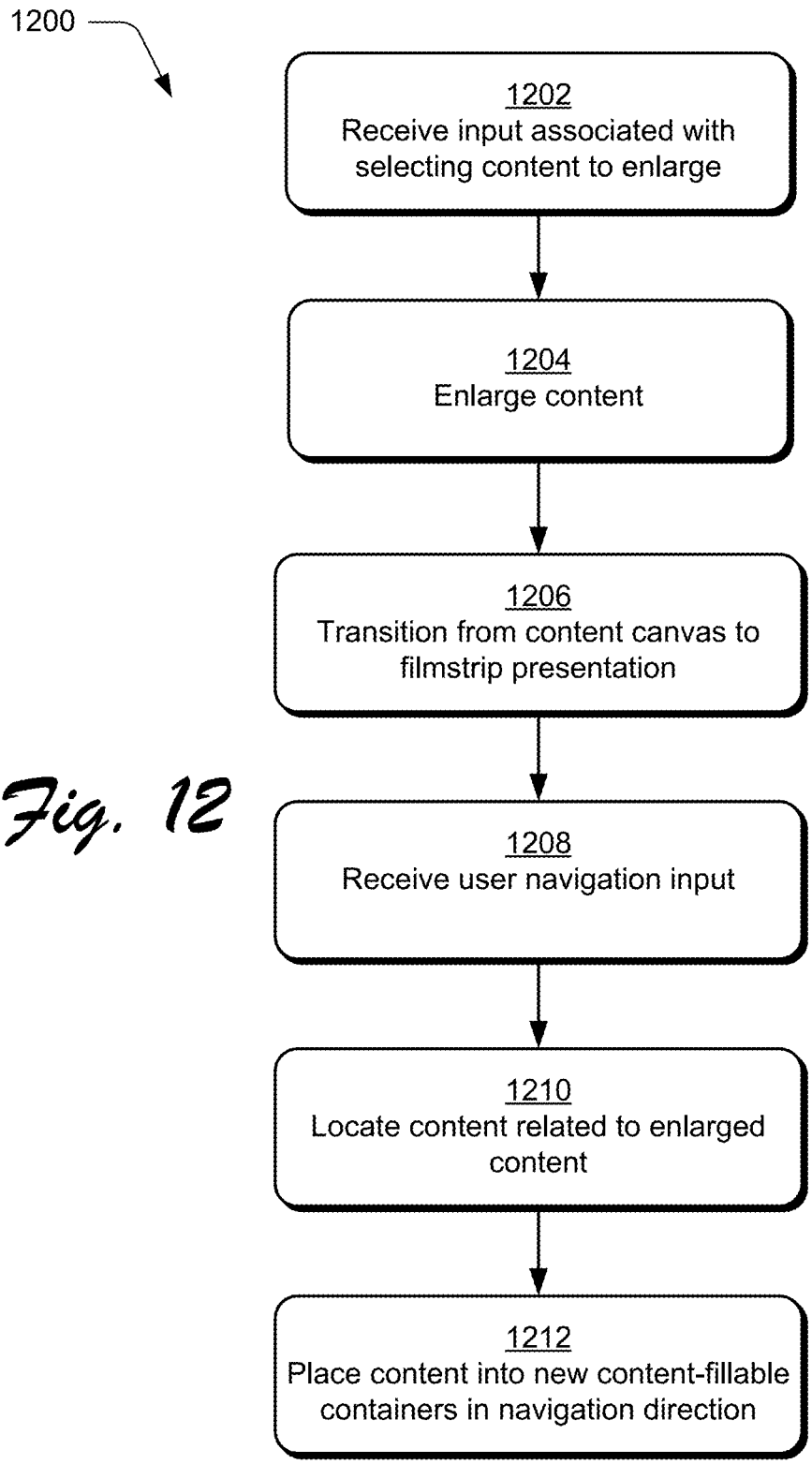
FIG. 12 is a flow diagram depicting a procedure in an example implementation in accordance with one or more embodiments.

FIG. 12 depicts a procedure 1200 in a content consuming implementation in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks.

At block 1202, input associated with selecting content to enlarge is received. In the illustrated and described embodiment, the input is received relative to a content canvas such as that described above. In those examples, the content canvas is scrollable in both horizontal and vertical directions. At block 1204, the content is enlarged. At block 1206, the content canvas is transitioned to a filmstrip presentation. The operation of this block can be performed simultaneously with the operation of block 1204. By transitioning to a filmstrip presentation, content is presented in a manner which is scrollable, in this embodiment, in a single dimension. For example in this particular embodiment, the content can be scrolled in either the horizontal direction or the vertical direction, but not both.

At block 1208, user navigation input is received. This operation can be performed in any suitable way. For example, this operation can be performed responsive to receiving a touch input, by way of a navigation gesture, to navigate the content canvas. Alternately or additionally, this operation can be performed by receiving device input, such as a mouse or stylus input, to navigate the content canvas. Alternately or additionally, this operation can be performed by receiving input by way of a natural user interface (NUI) in which a non-touch, gestural input is received. Such gestural input may take the form of a "swipe in space" that is captured by a device camera and recognized to be a navigation input.

At block 1210, content related to the enlarged content is located. This step can be performed in any suitable way, examples of which are provided above. At block 1212, the located content is placed into the new content-fillable containers in the navigation direction.

Having considered a predictive directional queuing module in accordance with one or more embodiments, consider now a history-based adaptive presentation implementation in accordance with one or more embodiments.

History-Based Adaptive Presentation Module—206

Often times, a user's content is presented chronologically so that users do not often see older content. In the embodiments described above, intelligent methods are used to surface content to the user in a manner that is designed to enhance the user experience by enabling them to view content randomly, or in a manner that is tailored to enhance the user's experience.

In one or more embodiments, the intelligent adaptive content canvas module 108 utilizes a history-based approach that selects content for populating the content-fillable containers based, at least in part, on a user's actions and/or behavior to thus intelligently tune the user experience. For example, the user's content-consuming experience can be tailored by leveraging the user's content browsing history, as described below. In this manner, more or less of certain types of content can be utilized to fill the content-fillable containers.

In one or more embodiments, the intelligent adaptive content canvas module 108, through its history-based adaptive presentation module 206, monitors a user's interaction with their content and builds a collection of metadata associated with each piece of content based upon the user's interaction. This metadata is then used to incrementally change a piece of content's level of importance so as to effect how it is selected to fill the content-fillable containers. Changing a piece of content's importance can cause the content to be moved to one or more particular specific queue, and/or removed from a current specific queue in which the content resides and added to one or more of the other specific queues.

For example, the history-based adaptive presentation module 206 can monitor which specific pieces of content the user consumes, "likes", comments on, changes, enlarges, and the like. Based on these interactions, individual pieces of content can have their associated level of importance incrementally changed. For example, if a user changes a piece of content by removing it from the content canvas, an assumption can be made that this piece of content is less important to the user than other pieces of content. Accordingly, this piece of content's level of importance can be reduced. Likewise, in at least some embodiments, content that is somehow related to this reduced-importance content can have associated importance levels reduced as well. Recall that content can be related based on number of different factors including, by way of example and not limitation, by time, by person or people tagged, by album, by geography, by keyword, and the like.

Similarly, if the user enlarges a piece of content, then an assumption can be made that this content is more important to the user than other content. Accordingly, the enlarged piece of content's level of importance can be elevated, as well as other related pieces of content. By manipulating the importance levels of content consumed by a user, more relevant content can be surfaced to the user.

In one or more embodiments, content whose levels of importance have been raised can be surfaced in different ways. For example, more important content can be surfaced more frequently. Alternately or additionally, more important content can be surfaced in larger-sized containers.

In at least some embodiments, the intelligent adaptive content canvas module can utilize the user's history to make content-consuming suggestions to the user. For example, after observing a user's behavior over a period of time, the intelligent adaptive content canvas module may suggest a particular photo book or slideshow to surface content to the user.

Figure 13:
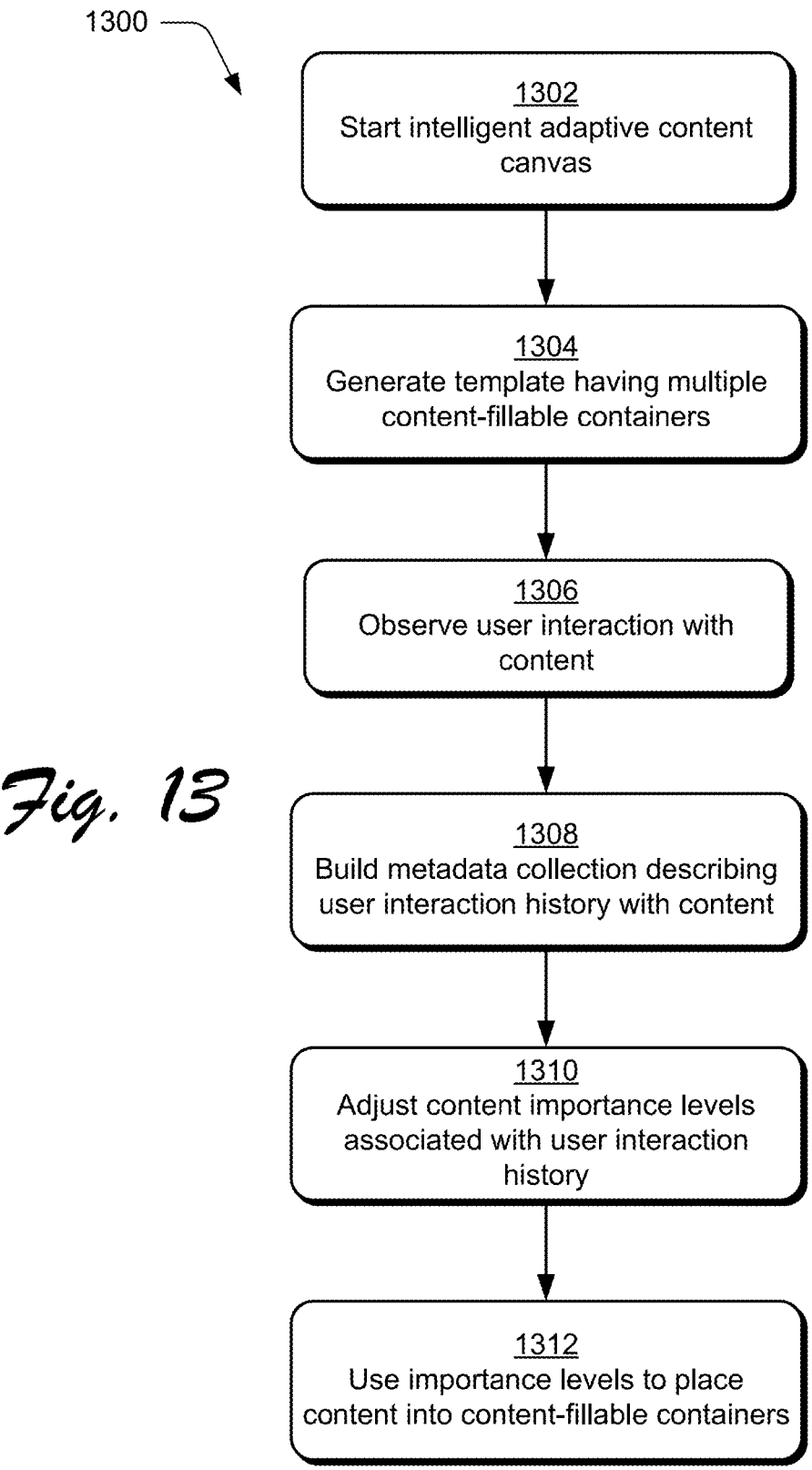
FIG. 13 is a flow diagram depicting a procedure in an example implementation in accordance with one or more embodiments.

FIG. 13 depicts a procedure 1300 in a history-based adaptive presentation implementation in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks.

At block 1302, the intelligent adaptive content canvas is started. This step can be performed by receiving a user input and, responsive to receiving the user input, launching the intelligent adaptive content canvas module 108 (FIG. 1). At block 1304, a template having multiple content-fillable containers is generated and filled with content. An example of a template and content-fillable containers is provided above.

At block 1306, user interaction with the content appearing in the content canvas is observed. Examples of how this can be done are provided above. At block 1308, a metadata collection describing the user interaction history with the content is built. At block 1310, content importance levels associated with the user interaction history are adjusted. This operation can be performed by reducing or elevating a particular piece of content's level of importance based on the user interaction. This operation can also be performed by reducing or elevating levels of importance of content that is related, in some way, to content with which the user interacts. At block 1312, importance levels are used to place content into content-fillable containers. This operation can be performed in any suitable way. For example, as a user navigates the content canvas, decisions can be made about which content gets surfaced to the user based on the user interaction history.

Having considered various intelligent adaptive content canvas embodiments, consider now an example system and device that can be utilized to implement one or more of the embodiments described above.

Example System and Device

Figure 14:
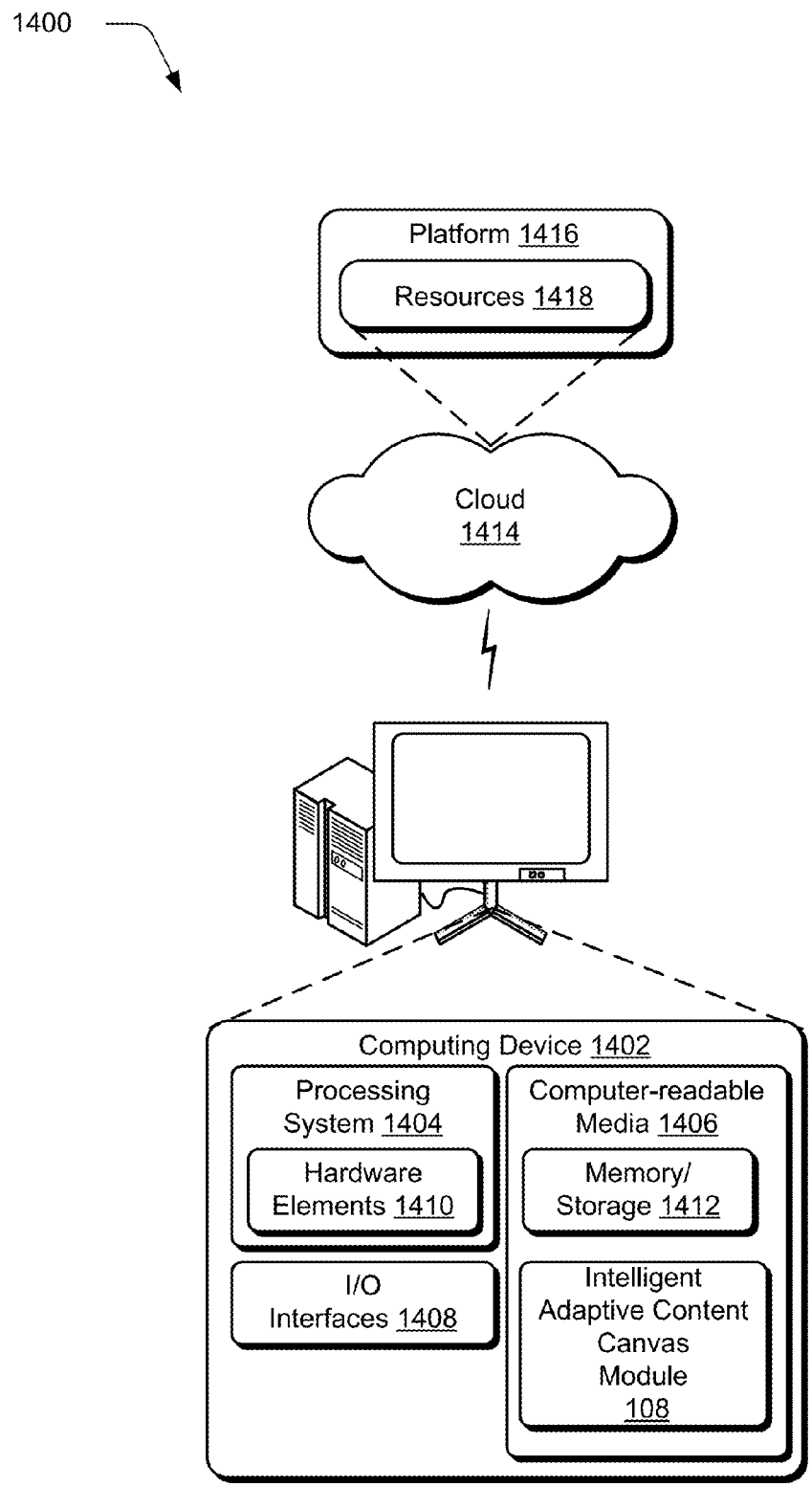
FIG. 14 illustrates an example system including various components of an example device that can be implemented as any type of computing device as described and/or utilize with reference to FIGS. 1-13 to implement embodiments of the techniques described herein.

FIG. 14 illustrates an example system generally at 1400 that includes an example computing device 1402 that is representative of one or more computing systems and/or devices that may implement the various techniques described herein. This is illustrated through inclusion of the intelligent adaptive content canvas module 108, which operates as described above. The computing device 1402 may be, for example, a server of a service provider, a device associated with a client (e.g., a client device), an on-chip system, and/or any other suitable computing device or computing system.

The example computing device 1402 is illustrated includes a processing system 1404, one or more computer-readable media 1406, and one or more I/O interface 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1406 is illustrated as including memory/storage 1412 and the intelligent adaptive content canvas module 108. The memory/storage 1412 represents memory/storage capacity associated with one or more computer-readable media. The memory/storage component 1412 may include volatile media (such as random access memory (RAM)) and/or nonvolatile media (such as read only memory (ROM), Flash memory, optical disks, magnetic disks, and so forth). The memory/storage component 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of a module that is executable by the computing device 1402 as software may be achieved at least partially in hardware, e.g., through use of computer-readable storage media and/or hardware elements 1410 of the processing system 1404. The instructions and/or functions may be executable/operable by one or more articles of manufacture (for example, one or more computing devices 1402 and/or processing systems 1404) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 may include applications (such as the intelligent adaptive content canvas module 108) and/or data that can be utilized while computer processing is executed on servers that are remote from the computing device 1402. Resources 1418 can also include services provided over the Internet and/or through a subscriber network, such as a cellular or Wi-Fi network.

The platform 1416 may abstract resources and functions to connect the computing device 1402 with other computing devices. The platform 1416 may also serve to abstract scaling of resources to provide a corresponding level of scale to encountered demand for the resources 1418 that are implemented via the platform 1416. Accordingly, in an interconnected device embodiment, implementation of functionality described herein may be distributed throughout the system 1400. For example, the functionality may be implemented in part on the computing device 1402 as well as via the platform 1416 that abstracts the functionality of the cloud 1414.

CONCLUSION

Various embodiments provide an intelligent adaptive content canvas that can enable users to access content, such as photos and videos, and consume the content in an adaptive environment that tailors the user experience in accordance with various parameters. The user experience is personalized to the user and is adaptively predictive in a manner that attempts to surface content that the user would likely wish to consume.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
generating a scrollable template having multiple content-fillable containers configured to be filled with content comprising user-specific content;
observing user interaction with the content in the multiple content-fillable containers during display in the multiple content-fillable containers;
maintaining display of the multiple content-fillable containers following the observed user interaction;
building a collection of metadata associated with portions of the content based on the observed user interaction with the content, the collection of metadata describing user interaction history with the content;
adjusting content importance levels based, at least in part, on the collection of metadata;
using the content importance levels to place the content into the content-fillable containers;
receiving a user navigation input relative to the scrollable template;
responsive to receiving the user navigation input, generating one or more additional scrollable templates having multiple new content-fillable containers; and
using the content importance levels to place additional content into the multiple new content-fillable containers by inserting the additional content into the multiple new content-fillable containers from multiple sources, to enable viewing of the additional content.

2. A method as described in claim 1, wherein said using the content importance levels to place the content is performed by interleaving the content from multiple sources, at least one of which being remote.

3. A method as described in claim 1 further comprising adjusting the content importance levels of additional content that is related to the content having an adjusted importance level.

4. A method as described in claim 1, wherein said using the content importance levels to place the content is performed by adjusting frequencies at which the content is placed into the content-fillable containers.

5. A method as described in claim 1, wherein said using the content importance levels to place the content is performed by adjusting the content-fillable container sizes in accordance with the content importance levels.

6. One or more computer-readable storage media comprising instructions that are stored thereon that, responsive to execution by a computing device, causes the computing device to perform operations comprising:
analyzing content for placement into content-fillable containers;
assigning content importance levels to each individual portion of the content;
computing an importance distribution of the content based on the content importance levels;
generating a template having multiple content-fillable containers configured to be filled with the content comprising user-specific content and to be sized based on the importance distribution, the user-specific content including at least some photos;
observing user interaction with the user-specific content in the multiple content-fillable containers during display in the multiple content-fillable containers;
adjusting the content importance levels based, at least in part, on the observed user interaction;
adjusting content importance levels of additional content that is related to the content having an adjusted importance level; and
inserting the user-specific content from multiple sources into the content-fillable containers, based at least in part on the content importance levels, to enable viewing of the user-specific content, at least one of the multiple sources being a remote source.

7. One or more computer-readable storage media as described in claim 6 further comprising providing, through a user interface instrumentality, an ability to toggle on or toggle off individual sources of said multiple sources.

8. One or more computer-readable storage media as described in claim 6, wherein said generating the template comprises generating the template as a function of one or more characteristics associated with the user-specific content.

9. One or more computer-readable storage media as described in claim 6, wherein said inserting is performed by adjusting frequencies at which the content is placed into the content-fillable containers.

10. A computing device comprising:
one or more processors;
one or more computer readable storage media embodying computer-readable instructions which, when executed under the influence of the one or more processors, implement a method comprising:
generating a scrollable template having multiple content-fillable containers configured to be filled with content comprising user-specific content, the user-specific content including at least some photos;
observing user interaction with the user-specific content in the multiple content-fillable containers during display in the multiple content-fillable containers;
maintaining display of the multiple content-fillable containers following the observed user interaction;
building a collection of metadata associated with each portion of the content based on the observed user interaction with the content, the collection of metadata describing user interaction history with the content;
adjusting content importance levels based, at least in part, on the collection of metadata;
using the content importance levels to place the content into the content-fillable containers;
adjusting content importance levels of additional content that is related to the content having an adjusted importance level;
receiving a user navigation input relative to the scrollable template;
responsive to receiving the user navigation input, generating one or more additional scrollable templates having multiple new content-fillable containers; and
using the content importance levels to place additional content into the new content-fillable containers.

11. The computing device of claim 10, wherein using the content importance levels to place the content is performed by interleaving the additional content into the new content-fillable containers from multiple sources, effective to enable viewing of the additional content.

12. The computing device of claim 10, wherein using the content importance levels to place the content is performed by interleaving the additional content into the new content-fillable containers from multiple sources, effective to enable viewing of the additional content, at least one of the multiple sources being a remote source.

13. The computing device of claim 10, wherein said generating the scrollable template comprises generating the scrollable template as a function of one or more characteristics associated with the user-specific content.

14. The computing device of claim 10, wherein said using the content importance levels to place the content is performed by adjusting frequencies at which the content is placed into the content-fillable containers.

15. The computing device of claim 10, wherein said using the content importance levels to place the content is performed by adjusting the content-fillable container sizes in accordance with the content importance levels.

16. A method comprising:
analyzing content for placement into content-fillable containers;
assigning content importance levels to each individual portion of the content;
computing an importance distribution of the content based on the content importance levels;
generating a template having multiple content-fillable containers configured to be filled with the content comprising user-specific content and to be sized based on the importance distribution, the user-specific content including at least some photos;
observing user interaction with the user-specific content in the multiple content-fillable containers during display in the multiple content-fillable containers;
adjusting the content importance levels based, at least in part, on the observed user interaction; and
inserting the user-specific content from multiple sources into the content-fillable containers by adjusting frequencies at which content is placed into the content-fillable containers, based at least in part on the content importance levels, to enable viewing of the user-specific content, at least one of the multiple sources being a remote source.

17. The method of claim 16 further comprising providing, through a user interface instrumentality, an ability to toggle on or toggle off individual sources of said multiple sources.

18. The method of claim 16, wherein said generating the template comprises generating the template as a function of one or more characteristics associated with the user-specific content.

19. The method of claim 16 further comprising adjusting the content importance levels of additional content that is related to the content having an adjusted importance level.

20. A method comprising:
generating a scrollable template having multiple content-fillable containers configured to be filled with content comprising user-specific content, the user-specific content including at least some photos;
observing user interaction with the user-specific content in the multiple content-fillable containers during display in the multiple content-fillable containers;
maintaining display of the multiple content-fillable containers following the observed user interaction;
building a collection of metadata associated with portions of the content based on the observed user interaction with the content, the collection of metadata describing user interaction history with the content;
adjusting content importance levels based, at least in part, on the collection of metadata;
using the content importance levels to:
place the content into the content-fillable containers; and
adjust frequencies at which the content is placed into the content-fillable containers;
receiving a user navigation input relative to the scrollable template;
responsive to receiving the user navigation input, generating one or more additional templates having multiple new content-fillable containers; and
using the content importance levels to place additional content into the new content-fillable containers.

21. The method of claim 20, wherein using the content importance levels to place the content is performed by interleaving the additional content into the new content-fillable containers from multiple sources, effective to enable viewing of the additional content.

22. The method of claim 20, wherein using the content importance levels to place the content is performed by interleaving the additional content into the new content-fillable containers from multiple sources, effective to enable viewing of the additional content, at least one of the multiple sources being a remote source.

23. The method of claim 20, wherein said generating the scrollable template comprises generating the scrollable template as a function of one or more characteristics associated with the user-specific content.

24. The method of claim 20 further comprising adjusting the content importance levels of additional content that is related to the content having an adjusted importance level.

25. The method of claim 20, wherein said using the content importance levels to place the additional content is performed by adjusting frequencies at which the additional content is placed into the content-fillable containers.

26. The method of claim 20, wherein said using the content importance levels to place the content is performed by adjusting the content-fillable container sizes in accordance with the content importance levels.

27. A method as described in claim 1, further comprising:
assigning each scrolling direction of the scrollable template a dimension comprising a spectrum of values;
analyzing the content for content values associated with each dimension;
receiving a user navigation input relative to the scrollable template;
locating, responsive to receiving the user navigation input, the content having content values corresponding to the spectrum values relative to the scrolling direction;
generating, responsive to receiving the user navigation input, one or more additional templates having multiple new content-fillable containers;
using the content importance levels to place the content into the new content-fillable containers effective to enable viewing of the additional content relative to the dimension assigned to the scrolling direction of the received user navigation input,
wherein the dimension for each scrolling direction includes time, color, friend closeness, content popularity, content location distance from a point, unsorted lists, albums, or events.

28. One or more computer-readable storage media as described in claim 6, wherein generating the template comprises generating a scrollable template and further comprising:
assigning each scrolling direction of the template a dimension comprising a spectrum of values;
analyzing the content for content values associated with each dimension;
receiving a user navigation input relative to the scrollable template;
responsive to receiving the user navigation input, generating one or more additional templates having multiple new content-fillable containers; and
interleaving additional content into the multiple new content-fillable containers from said multiple sources, based at least in part on the content importance levels, effective to enable viewing of the additional content,
wherein the dimension for each scrolling direction includes time, color, friend closeness, content popularity, content location distance from a point, unsorted lists, albums, or events.

29. The method of claim 16, wherein generating the template comprises generating a scrollable template and further comprising:
assigning each scrolling direction of the template a dimension comprising a spectrum of values;
analyzing the content for content values associated with each dimension;
receiving a user navigation input relative to the scrollable template;
responsive to receiving the user navigation input, generating one or more additional templates having multiple new content-fillable containers; and
interleaving additional content into the multiple new content-fillable containers from said multiple sources, based at least in part on the content importance levels, effective to enable viewing of the additional content,
wherein the dimension for each scrolling direction includes time, color, friend closeness, content popularity, content location distance from a point, unsorted lists, albums, or events.

30. One or more computer-readable storage media as described in claim 6, wherein said generating the template further comprising:
generating larger sized content-fillable containers associated to a high level of importance based on the importance distribution; and
generating smaller sized content-fillable containers associated to a low level of importance based on the importance distribution.

31. The method of claim 16, wherein said generating the template further comprising:
generating larger sized content-fillable containers associated to a high level of importance based on the importance distribution; and
generating smaller sized content-fillable containers associated to a low level of importance based on the importance distribution.

* * * * *